July 29, 1941.    A. BOYNTON    2,250,464
DIFFERENTIAL STAGE LIFT FLOW DEVICE
Filed Dec. 8, 1939
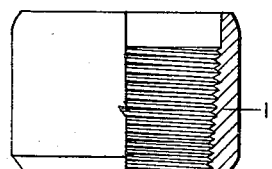
Fig. 3.
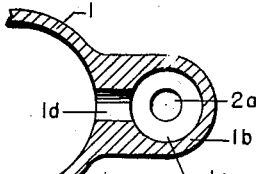
Fig. 6.
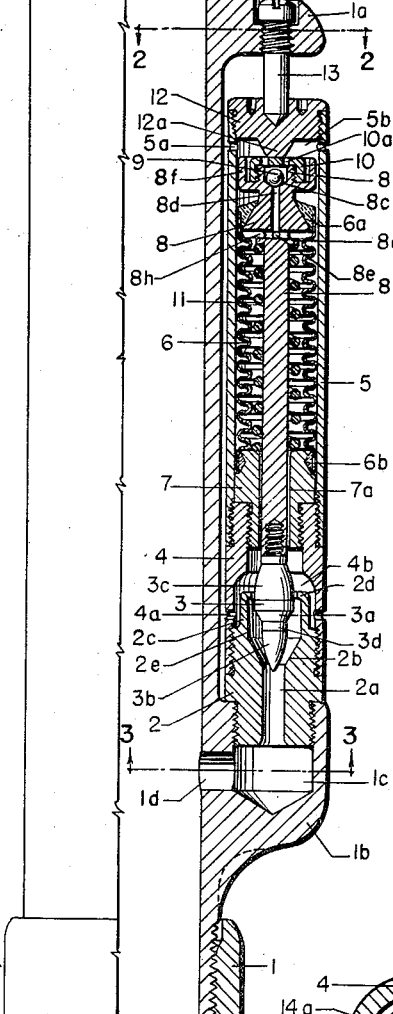
Fig. 1.
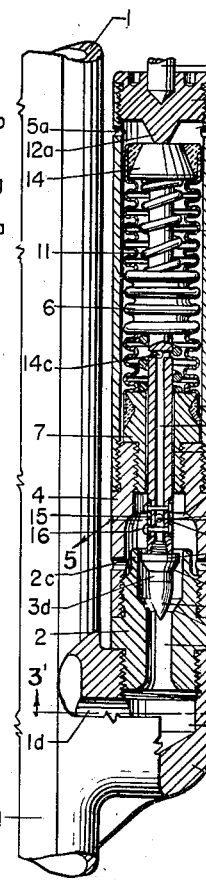
Fig. 4.
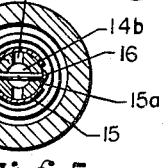
Fig. 5.
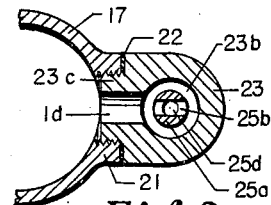
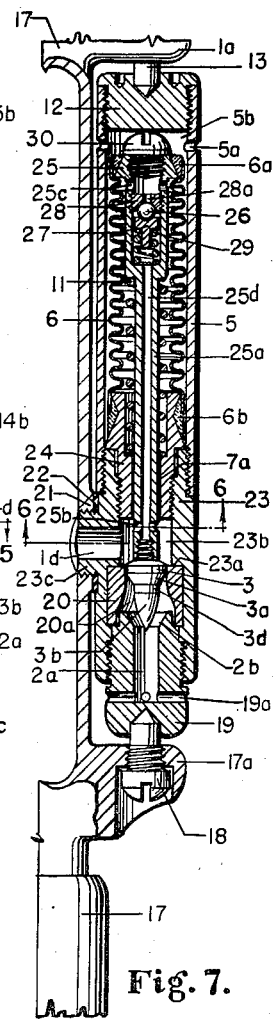
Fig. 7.
Fig. 2.
ALEXANDER BOYNTON,
INVENTOR,
BY Jesse R. Stone
Lester B. Clark
ATTORNEYS.

Patented July 29, 1941

2,250,464

UNITED STATES PATENT OFFICE 2,250,464

DIFFERENTIAL STAGE LIFT FLOW DEVICE

Alexander Boynton, San Antonio, Tex.

Application December 8, 1939, Serial No. 308,320

6 Claims. (Cl. 137—111)

My invention relates to differential flow devices for wells, especially wells producing oil.

The principal object is to start and flow wells at relatively low pressures with comparatively low gas-liquid ratios.

Another object is to employ for this purpose a device that will not admit pressure fluid in response to false differentials resulting from slippage in the eduction tube.

Another object is to provide a device for the purpose stated that utilizes pressure upon an area much greater than that of the valve to control the movements of the valve.

Still another object is to employ a device of few moving parts having large clearances adapted to be unaffected by the action of sand and other foreign substances frequently present in pressure fluid and well liquid.

I attain these and other objects by means of a metallic bellows secured at one end within a housing tube adjacent to the eduction tube in such manner as to have its outside surface exposed to the pressure fluid and its inside surface exposed to the pressure within the well tubing, the free end of the bellows being attached to a normally open valve adapted to close on a seat controlling the flow of pressure fluid through the device at a predetermined difference in the value of the forces within the tubing and in the annular space between the tubing and the casing. In this connection, I employ a check valve to prevent the valve controlling the flow of pressure fluid from being forced open by momentary pressure disturbances within the eduction tube; all of which will be clearly understood by an examination of the following specification and the accompanying drawing, in which—

Fig. 1 is mainly a longitudinal section through the preferred embodiment of the invention.

Fig. 2 is a cross section on the line 2—2, Fig. 1.

Fig. 3 is a cross section on the line 3—3, Fig. 1.

Fig. 4 is a partial longitudinal section through the first modified form of the invention.

Fig. 5 is a cross section on the line 5—5, Fig. 4.

Fig. 6 is a cross section on the line 6—6, Fig. 7.

Fig. 7 is a partial longitudinal section through the second modified form of the invention.

Similar reference characters are employed to designate similar parts throughout the several views.

The primed section 3'—3' in Fig. 4 will be understood as being identical with the unprimed section 3—3 bearing the same reference numerals in Fig. 1, but since some of the parts cut by the primed section are somewhat different in other places than where so cut, the section is thus distinguished to avoid possible confusion.

In Fig. 1, the tubing nipple 1, which may be a steel casting adapted to be threadedly joined into the well tubing, has the lateral projections 1a and 1b. The anchor bushing 2 has threaded connection within the anchoring projection 1b and the connection bushing 4 is threadedly joined to said anchor bushing and to the bellows housing nipple 5, the upper end of which is closed by the plug 12. This plug has a recess in its upper end adapted to closely receive the stud 13 having threaded engagement through the extension 1a for the purpose of securing the members 4 and 5 in alignment with the tubing nipple 1.

Housed within the nipple 5 is a metallic bellows 6, having slight clearance within the nipple 5. Said bellows may be secured upon its upper connection 8 by the solder or weld 6a and likewise secured upon its lower connection 7 by the solder or weld 6b. Bellows having an outside diameter of one to one and one half inches will be found satisfactory for these purposes. Within the bellows is a coiled spring 11 which has slight clearance over a depending extension 8a of the member 8 and somewhat larger clearance with the bellows. This spring, having its ends engaged between the member 7 and the flange 8g of the member 8 may be installed under sufficient compression to normally stretch the bellows a distance equal to approximately one half of the travel of the valve 3a, which is mounted on the lower end of extension 8a. Such bellows may be compressed or stretched 15 per cent of its free length without deforming. If then the valve travel be ⅝ inch, the spring 11 preferably should stretch the bellows 1/16 inch in order that it will operate one half in stretch and the other half in compression. A bellows 3" long, therefore, will allow ⅝ inch valve travel with an ample factor of safety.

The bellows lower end connection 7 may be threadedly joined into the bushing 4. Proximate the upper end of the device the cap 10 contacts the depending extension 12a of the plug 12 so as to position the upper extremity of the central untapered portion of the valve member 3 opposite the lower edge of the governor flange 2d of the anchor bushing 2, thus also the valve 3a is properly spaced from its seat 2b; while the lower end of the metering pin 3b, preferably, should be slightly within the opening 2a central of the anchor bushing.

The depending extension 8a, having threaded connection with the valve member 3, has the slight clearance 7a through the member 7. This clearance may be such as 1/64 to 1/8 inch.

The annular extension 8b of the member 8 has its central opening formed into the valve seat 8c adapted to be engaged by the check valve 9 confined by the cap 10 threadedly engaged over the extension 8b. The head 8f may have the same clearance within the nipple 5 as the outer corrugations of the bellows have within it.

Within the number 8 the recess 8h, the lateral openings 8e, and the longitudinal opening 8d provide communication between the interior of the bellows and the check valve 9. The openings 10a vent the chamber which contains this valve.

As the valve 3a approaches its seat 2b formed centrally above the opening 2a, the convexly tapered metering pin 3b, having the untapered portion 3d, will gradually reduce the clearance between it and the opening 2a, as is apparent. The greatest diameter of this pin in the untapered portion 3d immediately under the valve 3a may be only slightly less than the diameter of the opening 2a. The flow of pressure fluid through the device, therefore, is cut off by a combined sleeve and poppet valve. The convexly tapered metering shank 3c has its taper in the opposite direction from the otherwise similarly formed, but somewhat smaller, pin 3b. The lower end of the convexly tapered shank 3c, normally opposite the lower edge of the flange 2d, has slight clearance through this flange. This clearance will increase as the valve member 3 moves downward. The greatest flow of pressure fluid through the device, therefore, will be when the valve 3a is approximately half way of its travel, this being during the prevalence of one-half the differential required to close that valve.

Compressed air or gas, herein referred to as pressure fluid, within the annular space between the tubing and the casing, causes the well liquid to form an upstanding column in the tubing. These devices discharge a predetermined quantity of pressure fluid into that column at predetermined differences between the force of the pressure fluid and the force exerted by the upstanding column. This difference between said forces will be referred to as the differential.

The force of the pressure fluid is constant at any given value thereof at all devices above the base of the upstanding column. This force tends to close the valves in the devices; while the bellows and contained spring adapted to resist compression of the bellows and the force exerted by the upstanding column are the forces tending to unseat the valve controlling the flow of pressure fluid through the devices. Each of these forces is constant, except that of the upstanding column which exerts a different force at each different level therein.

The pressure fluid control valves are normally open until closed by the differential.

Expulsion of well liquid from the eduction tube will be understood as accomplished by the expansion of pressure fluid within the upstanding column.

In order to produce constant well flow, the devices preferably will be adjusted to close their pressure fluid control valves at a differential somewhat greater than the force per square inch of a column of unaerated well liquid approximately twice as high as the devices are spaced apart; and in order that this flow will be uniform, the devices should be so constructed as to admit the greatest volume of pressure fluid at approximately one-half the differential required to close the valves controlling flow thereof.

With the above in mind, the devices may be connected into the flow tubing at intervals varying between 200 and 300 feet.

The path of the pressure fluid out of the annular space between the tubing and the casing and into the upstanding column of well liquid within the tubing is via the lateral intake openings 4a, the chamber 4b, the clearance between the flanged 2d and the metering shank 3c, the chamber 2e, the central longitudinal opening 2a, the chamber 1c, and the lateral opening 1d.

While the device is intaking pressure fluid through the small openings 4a, the pressure within the chamber 4b will be less than the pressure obtaining within the chamber 5b, because the chamber 4b is vented into the tubing, as previously stated and as appears; while the chamber 5b has no outlet for the pressure fluid entering through the lateral openings 5a, this chamber, which contains the bellows, having its lower end closed by the member 7. The pressure within the chamber 5b and upon the outside of the bellows will be that of the pressure fluid in the annular space between the casing and the tubing; while the lesser pressure within the chamber 4b communicates with the interior of the bellows through the annular clearance 7a. It is apparent, therefore, that the differential force will act upon the bellows to compress it and at a predetermined value thereof to seat the valve 3a.

During this valve's travel toward its seat, pressure fluid within the bellows must have free passage to escape therefrom if the valve movement is to be unimpeded. Such escape is provided for by the check valve 9, supplementing the restricted clearance 7a which, alone, would not allow the pressure fluid within the bellows to escape fast enough to allow the valve 3a to be quickly responsive to the differential valve closing force.

As the bellows is compressed, pressure fluid within it may escape through the openings 8e and 8d by raising the check valve 9, thus enabling the valve 3a to freely approach its seat.

Heretofore, the one greatest fault of automatic differential flow valves has been that they would be forced open by temporary false differentials produced within the eduction tube by falling slugs caused by the breaking through of pressure fluid. Such disturbances occurring in the use of current types of differential flow valves force open all valves below where the disturbances occur; and once the lower valves are forced open, they admit enough pressure fluid to expel all liquid above them as a slug. The excessive pressure so admitted under such slugs will then force open each upper valve as the slugs pass. This condition, therefore, becomes more aggravated in deeper wells, in proportion to the greater number of flow devices employed to flow them; resulting in diminishing efficiency as the depth increases.

To overcome this improper opening of the pressure fluid valves, I employ the check valve 9 to retard the opening of the pressure fluid valves until the temporary disturbances of false differentials have subsided.

The devices herein shown will not have their pressure fluid control valves unseated by false low differentials, because the check valve 9 closes when the valve 3a unseats and the bellows attempts to elongate. At such time, there is no way for pressure fluid or well liquid to enter the bellows and produce therein the increased pressure resulting from false differentials, except through the clearance 7a. This clearance may be made so slight that the false differentials will disappear before the untapered section 3d will pass out of the opening 2a. The valve 3a thus is made responsive only to true differentials which will cause the inflow of pressure fluid through the devices to be accurately metered to the liquid load by the undisturbed action of the metering pin 3b co-acting with the opening 2a and by the metering shank 3c co-acting with the governor flange 2d, as was explained.

The baffle 2c, by directing the inflowing pressure fluid into the chamber 4b, prevents abrasive substances in the pressure fluid from cutting the valve member 3 and its metering pin and shank, as is apparent.

In this connection, it should be observed that the openings 4a should be no larger than required to admit the proper volume of pressure fluid to flow the well, because if these openings be too large, the pressure within the chamber 4b will be unnecessarily great and will impart excessive pressure to the interior of the bellows.

In Fig. 4, illustrating the first modified form of the invention, the bellows upper connection 14 has a depending extension 14a, having the longitudinal opening 14b and the lateral openings 14c and 14d.

The spring steel band check valve 15 clearly shown in Fig. 5, is secured upon the lower extremity of the extension 14a by the rivets 16. This band formed to fit snugly over the extension 14a, and covering the lateral openings 14d, has a slight opening 15a between its ends (see Fig. 5), and receives the rivets 16 through small openings in its middle portion. The other end of each rivet has its head within the opening 15a. This spring check valve will open and allow fluid to escape freely out of the bellows on the down stroke of the valve 3a, but will close on the upstroke to retard the opening of the valve 3a in a manner similar to the action of the check valve 9 in Fig. 1, and for the same purpose.

In this construction, the governor flange 2d and the metering shank 3c as shown in Fig. 1 are omitted. The metering pin 3b in Fig. 4, therefore, will throttle the flow of pressure fluid in such manner as to provide for the greatest flow thereof through the device during the prevalence of small differentials.

Except for the foregoing slight changes in the check valve and metering construction, the device in Fig. 4 operates the same as was explained for Fig. 1.

In Fig. 7, illustrating the second modified form of the invention, I show the pressure fluid admitted into the device below the valve controlling the inflow of pressure fluid, instead of admitting the pressure fluid above that valve, as in Figs. 1 and 4.

The tubing nipple 17 has an internally threaded lateral boss 21 into which the lateral externally threaded boss 23c of the connection bushing 23 is connected, the washer 22 being employed to make the connection hermetic. The lower anchoring projection 17a is similar to the upper projection 1a. Except for the addition of the boss 21 and the projection 17a, the tubing nipple 17 in Fig. 7 is the same as the nipple 1 in Figs. 1 and 4.

The bushing 23 has its lower end threadedly joined over the lower end connection 19 which has its upper end engaged under the metering sleeve 20 pressed into the bushing 23 and landed upon the internal annular shoulder 23a. The nipple 5, threadedly connected with the bushing 23, has its upper end closed by the plug 12 into which the stud 13 extends, as in the previous embodiments. The lower end connection 19 has an external recess into which the lower securing stud 18 extends from its threaded engagement within the projection 17a for the purpose of co-acting with the stud 13 in securing alignment of the tubular assembly with the tubing nipple 17.

The bellows lower connection 24, threadedly engaged within the bushing 23, is secured upon the bellows 6 by the solder or weld 6b similar to the manner that the bellows upper end connection 25 is secured to the bellows by the solder or weld 6a. The connection 25 has a depending extension 25a, the lower end of which is threadedly joined to the valve member 3. The coiled spring 11, having slight clearance over the extension 25a and within the bellows 6, has its lower end landed upon an annular shoulder within the connection 24 and its upper end engaged under an enlargement of the extension 25a. This spring serves the same purpose here as in Figs. 1 and 4.

The metering sleeve 20, having its interior convexly tapered to form the chamber 20a, has its upper end normally opposite the upper end of the untapered central enlargement of the valve member 3 with which it has slight clearance. This position is caused by the normal engagement of the plug 12 with the plug 30 which latter plug also hermetically closes the opening through the upper end of the member 25.

It is apparent that the metering relation between the valve member 3 and the metering sleeve 20, co-acting with the convexly tapered pin 3b in its relation with the opening 2a will allow the greatest volume of pressure fluid to pass through the device at approximately one half the differential force required to seat the valve 3a upon its seat 2b.

Within an enlarged opening proximate the upper end of the member 25, the check valve 26, supported by the ball rest 27, is resiliently urged to normally close the central opening 28a of the housing plug 28 by force of the slight coiled spring 29, having small clearance with the surrounding wall. The member 27 has somewhat larger clearance with this wall in order to allow free passage of fluid.

As the bellows is compressed, the check valve 26 is unseated by fluid escaping downward through the openings 25c, 25d, and 25b. The valve 3d being seated, it will not be suddenly forced open, however, by falling slugs of well liquid, because during the elongating movement of the bellows, the check valve 26 will remain closed by suction from the interior of the bellows contacting it through the openings 25c and 28a as well as by force of the spring 29.

Pressure fluid enters the device through the intake openings 19a and thence proceeds through the opening 2a, the chamber 20a, the chamber 23b, and the opening 1d, where it comingles with the upstanding column of well liquid and expels it by expansion.

It will be understood that the bellows and check valve action is essentially the same in all forms of the invention, but that the action of the pressure fluid control valves are so different as to warrant a brief comparison or their actions. In Figs. 1 and 4, the valve 3a seats in the direction of the pressure fluid flow and the force of falling liquid slugs in the eduction tube acts to unseat the pressure fluid control valve by exerting force under it.

In Fig. 7, this action is reversed. The flow of pressure fluid is in the opposite direction from the seating movement of this valve and the force of falling slugs act on top of the valve to seat it momentarily with greater force. In this respect, the construction shown in Fig. 7 becomes the preferred embodiment.

It is apparent that the valve 3a will be urged to unseat quicker in Figs. 1 and 4 than in Fig. 7, but that the check valves can be made to delay this movemnt in all forms of the invention until after the differential disturbances have subsided, such disturbances being of short duration.

Obviously, many minor changes may be made and mechanical equivalents substituted for the parts shown, and I reserve the right to make such changes and substitutions within the scope of the stated objects and appended claims.

What is claimed is:

1. In a flowing device for wells, a valve body, a housing closed except for openings at its upper and lower ends and a passage from said housing into said body, a bellows diaphragm in said housing having its lower end sealably engaging the housing, the outer surface thereof being contacted through said upper openings with fluid pressure applied exteriorly of the body and housing, a restricted passage from the interior of said diaphragm to fluid pressure in said body, a valve at the lower end of said diaphragm and attached to the free end thereof to control the flow of pressure fluid through said first mentioned passage, a constricted upper outlet port from the interior of said bellows diaphragm to the interior of the housing, and a leak valve in said outlet port adapted to close as said bellows is contracted.

2. In a flowing device for wells, a valve body having a tubular housing thereon, a passage from the lower end of said housing to the interior of said body, air or gas inlet openings adjacent the upper and lower ends of said housing, a bellows diaphragm in said housing, a compression spring in said diaphragm, a stationary plug to which the lower end of said diaphragm has a sealing connection, said plug having an axial opening, a movable upper plug supported upon and sealing the upper end of said diaphragm except for a vent opening therethrough, a downwardly closing valve in said vent opening, a valve stem on said upper plug projecting downwardly through said axial opening, a valve on said stem controlling the passage of pressure fluid to and from said housing and the interior of said body, the said valve stem fitting loosely through the axial opening in said stationary plug thereby providing a passage of gas from a point adjacent the passage into said tube to the interior of said diaphragm.

3. A stage lift device for attachment to an eduction tube including, a valve body, a tubular housing having openings therein adjacent its upper and lower ends, a passage from said housing to the interior of said body, a bellows diaphragm in said housing, means supported upon and closing the upper end said diaphragm, a vent opening in said closing means, an outwardly opening check valve in said vent opening, a lower stationary plug in said housing, the lower end of said diaphragm having a sealing support thereon, a stem on said upper closing means extending loosely through an axial opening in said lower plug, a valve on said stem controlling the passage of fluid to and from the interior of said body, the fluid pressure on the interior of said diaphragm having a vent to the interior of the body when said valve is open.

4. In a flow device for wells, a valve body, a tubular housing thereon having a passage to said body, a bellows diaphragm in said housing, a plug in said housing forming a stationary support for the lower end of said diaphragm, an upper plug on said diaphragm, a vent passage from the interior of said diaphragm to the outside thereof, an outwardly opening chack valve in said vent passage, a stem secured to and movable with said upper plug, said stem extending freely through an axial opening in said lower support, a valve on said stem controlling the passage to said body, and means in said diaphragm normally holding said valve in open position.

5. In a flow valve for wells, a valve body, a valve housing on said body, a fluid passage from said housing to the interior of said body, there being fluid openings in said housing, a valve chamber at the lower end of said housing tapered downwardly to said passage, a fluid chamber in said housing, a baffle separating said chambers, a valve in said valve chamber, means responsive to differential fluid pressures outside and inside said body to move said valve relative to said passage, means to slow down the opening movement of said valve, and means tending to hold said valve normally open.

6. In a flow valve for wells, a valve body, a valve housing on said body, a fluid passage from said housing to said body, there being fluid openings in said housing, a valve chamber at the lower end of said housing tapered downwardly to said passage, a fluid chamber in said housing, a baffle separating said chambers, a valve in said valve chamber, means responsive to differential fluid pressures outside and inside said tube to move said valve relative to said passage, a tapered area on said valve to engage on the upper end of said passage, a convexly tapered extension below said tapered area to meter the flow of pressure fluid as said valve moves toward closed position, means to slow down the opening movement of said valve, and means tending to hold said valve normally open.

ALEXANDER BOYNTON.